United States Patent
Ferreira

(10) Patent No.: US 10,979,420 B2
(45) Date of Patent: Apr. 13, 2021

(54) METHOD FOR AUTHENTICATING WITH A PASSWORD COMPRISING A SALT

(71) Applicant: Orange, Paris (FR)

(72) Inventor: Loic Ferreira, Caen (FR)

(73) Assignee: ORANGE, Paris (FR)

( * ) Notice: Subject to any disclaimer, the term of this patent is extended or adjusted under 35 U.S.C. 154(b) by 366 days.

(21) Appl. No.: 16/311,445

(22) PCT Filed: Jun. 16, 2017

(86) PCT No.: PCT/FR2017/051581
§ 371 (c)(1),
(2) Date: Dec. 19, 2018

(87) PCT Pub. No.: WO2017/220899
PCT Pub. Date: Dec. 28, 2017

(65) Prior Publication Data
US 2019/0245842 A1   Aug. 8, 2019

(30) Foreign Application Priority Data

Jun. 20, 2016 (FR) ........................ 1655707

(51) Int. Cl.
*G06F 21/31* (2013.01)
*H04L 9/32* (2006.01)
(Continued)

(52) U.S. Cl.
CPC ............ *H04L 63/083* (2013.01); *G06F 21/31* (2013.01); *H04L 9/0643* (2013.01);
(Continued)

(58) Field of Classification Search
CPC ... H04L 63/083; H04L 9/0643; H04L 9/3228; H04L 63/0884; G06F 21/31;
(Continued)

(56) References Cited

U.S. PATENT DOCUMENTS 8,789,753 B1 * 7/2014 de Jong .............. H04L 63/0853
235/382
RE46,513 E * 8/2017 Bisbee .................... F23H 17/12
(Continued)

FOREIGN PATENT DOCUMENTS

WO    2006014358 A1   2/2006

OTHER PUBLICATIONS

International Search Report dated Aug. 30, 2017 for corresponding International Application No. PCT/FR2017/051581, filed Jun. 16, 2017.
(Continued)

*Primary Examiner* — Techane Gergiso
(74) *Attorney, Agent, or Firm* — David D. Brush; Westman, Champlin & Koehler, P.A.

(57) ABSTRACT

A method for authenticating a user by a verifier device. The method includes: receiving a password entered by a user and a first piece of context information entered by the user; calculating a current fingerprint, by applying a one-way function to the password and to the first piece of context information; and verifying that the current calculated fingerprint is equal to a reference fingerprint of a secret, calculated during a preceding authentication of the user, the authentication being successful when the current fingerprint is equal to the reference fingerprint.

6 Claims, 1 Drawing Sheet

(51) Int. Cl.
   *H04L 9/06* (2006.01)
   *H04L 29/06* (2006.01)
   *H04W 12/06* (2021.01)
(52) U.S. Cl.
   CPC ........ *H04L 9/3228* (2013.01); *H04L 63/0884* (2013.01); *H04W 12/06* (2013.01); *G06F 2221/2103* (2013.01); *G06F 2221/2111* (2013.01); *G06F 2221/2151* (2013.01)
(58) Field of Classification Search
   CPC ..... G06F 2221/2103; G06F 2221/2111; G06F 2221/2151; H04W 12/06
   See application file for complete search history.

(56) References Cited

U.S. PATENT DOCUMENTS

| | | | |
|---|---|---|---|
| 2003/0131266 A1 | 7/2003 | Best et al. | |
| 2004/0003280 A1* | 1/2004 | Narayanan | H04W 36/0038 726/12 |
| 2004/0088587 A1* | 5/2004 | Ramaswamy | G06F 21/32 726/5 |
| 2008/0098469 A1* | 4/2008 | Morijiri | H04L 63/0884 726/5 |
| 2009/0228701 A1* | 9/2009 | Lin | H04L 9/321 713/155 |
| 2011/0131415 A1* | 6/2011 | Schneider | H04L 63/0853 713/171 |
| 2013/0232541 A1* | 9/2013 | Kapadia | G06F 21/40 726/1 |
| 2014/0040628 A1* | 2/2014 | Fort | H04L 63/0869 713/182 |
| 2014/0075492 A1* | 3/2014 | Kapadia | H04L 63/102 726/1 |
| 2015/0033303 A1* | 1/2015 | VanBlon | G06F 21/46 726/6 |
| 2015/0128234 A1* | 5/2015 | Xavier | H04L 63/0869 726/6 |
| 2015/0172291 A1* | 6/2015 | Zhang | H04L 9/3226 726/7 |
| 2016/0070903 A1* | 3/2016 | Abuelsaad | G06F 21/45 726/6 |
| 2017/0346821 A1* | 11/2017 | Yedidi | H04L 63/083 |

OTHER PUBLICATIONS

Written Opinion of the International Searching Authority dated Aug. 30, 2017 for corresponding International Application No. PCT/FR2017/051581, filed Jun. 16, 2017.

Alex Halderman J et al. "A convenient method for securely managing passwords." 14th International Conference on World Wide Web, WWW 2005: Chiba Japan, May 10-14, 2005, Association for Computing Machinery, New York, N.Y. pp. 471-479. May 10, 2005.

English Translation of the Written Opinion of the International Searching Authority dated Sep. 7, 2017 for corresponding International Application No. PCT/FR2017/051581, filed Jun. 16, 2017.

* cited by examiner

METHOD FOR AUTHENTICATING WITH A PASSWORD COMPRISING A SALT

CROSS-REFERENCE TO RELATED APPLICATIONS

This Application is a Section 371 National Stage Application of International Application No. PCT/FR2017/051581, filed Jun. 16, 2017, the content of which is incorporated herein by reference in its entirety, and published as WO 2017/220899 on Dec. 28, 2017, not in English.

FIELD OF THE DISCLOSURE

The present invention relates to an authentication method.
One particularly advantageous application thereof is in the access to sensitive services the use of which requires a successful authentication of a user. The method in particular allows these services to be protected from brute-force attacks.

BACKGROUND OF THE DISCLOSURE

One of the known and very widely used authentication mechanisms consists in using a password w, which is a secret value known only to the user and sometimes to the entity known as a verifier (by which the user must be authenticated). This mechanism has the advantage of being able to be deployed easily.

The security of the password then rests on three elements: the choice of the password, which must be sufficiently complex for an attacker not to be able to find it easily, the transmission of the password during the authentication, which must be carried out over a secure channel, and the storage of the password, which is required since a verifier must be able to compare the password received from the user with a reference value. This reference value, if it is disclosed following a successful attempt to compromise the database in which it is stored, must not allow an attacker to determine the corresponding password.

In general, passwords are stored in encrypted form in a database managed by the verifier. The verifier must be able to determine whether the password transmitted by the user during the authentication is correct. It is however not desirable to permanently possess all the passwords, even in encrypted form. For this reason, it is conventional to use a non-invertible function, such as a secure hash function H, to produce a fingerprint H(w) of the password w, and to store this fingerprint H(w). The advantage of using a non-invertible function such as a hash function is that, starting with the fingerprint H(w), it is difficult to determine the password w. However, exhaustive-search attacks, which consist in testing all the possible values w' of a password and in comparing the generated fingerprints H(w') with the stored fingerprint, remain possible.

Such exhaustive searches cannot be prevented, but there are methods that make them more difficult.

Thus, in a first example, the fingerprint of the reference password that is stored is not H(w) but it is in the form H(w|s), where s is a value generated pseudo-randomly by the verifier and conventionally called a "salt". The database then stores the pairs (H(w|s), s). Use of a salt makes it possible to thwart any attempt by an attacker to determine passwords by implementing pre-computations. In the case of pre-computations, an attacker applies a non-invertible function to a set of possible passwords and memorizes the obtained set. He then searches, among the memorized set, for a password fingerprint and identifies the associated password. With a salt that is different from one password to the next, to implement this technique the attacker must store in memory as many sets of passwords as there are possible salt values. This creates computational-time and memory constraints that the attacker must take into account when carrying out an attack.

One variant intended to slow the discovery of the password w from a reference fingerprint consists in artificially making the computations more difficult by applying the hash function a number of times. The fingerprint is then of the form: $F(w)=H^k(w|s)$. The number of iterations k is chosen such that the additional cost in terms of computation is negligible during the authentication of a user, but prohibitive in the case of an exhaustive search by an attacker; the cost then being multiplied by k.

These two techniques make it possible to slow down an exhaustive search by an attacker for a password but do not however prevent such an attack. Attackers remain inclined to implement such attacks, despite the substantial effort required thereby. Specifically, since the lifetime of a password is generally quite long, an attacker who is able to crack it will be able to exploit it for a long time. Furthermore, users are in general unwilling to frequently change their passwords.

SUMMARY

One of the aims of the invention is to remedy inadequacies/drawbacks of the prior art and/or to make improvements thereto.

To this end, the invention proposes a method for authentication of a user by a verifier, said method comprising:
  receiving a password input by the user and a first piece of context information input by the user,
  computing a current fingerprint, by applying a one-way function to the password and to the first piece of context information,
  verifying that the computed current fingerprint is equal to a reference fingerprint of a secret, which fingerprint was calculated during a preceding authentication of the user, the authentication being successful when the current fingerprint is equal to the reference fingerprint.

The method described here allows a substantial variability to be introduced into the secret used to decide whether or not a user is able to gain access to a sensitive service, without however requiring the user to make substantial memorization efforts. The secret used to authenticate the user is thus constructed from a password chosen by the user and from a first piece of context information that the user is required to input on each authentication. The password is complex insofar as the choice thereof is in general constrained by a requirement that various types of characters be used and by a requirement that it be of a minimum size; it in general possesses a long lifetime. The first piece of context information is not at all complex; it is in general the response to a simple question that requires little memorization effort. Moreover, its lifetime is short since it may be changed on each authentication of the user. Thus, during an authentication, the user provides his password and the first piece of context information, which was input during the preceding authentication thereof. It is this first piece of context information that introduces the variability into the secret.

The method allows the complexity, in terms of computational power, of exhaustive-search attacks to be increased, as the variability in the secret may oblige an attacker to begin his attack from scratch after each successful authentication of the user. The method is preferably applied to very sensitive services that the user often accesses. Specifically, the method increases the security of the password. In addition, frequent access facilitates memorization of the first piece of context information, which may be changed on each authentication.

In one example embodiment, the method comprises:
receiving a second piece of context information,
computing a new fingerprint, by applying the one-way function to the password and to the second piece of context information, and replacing the reference fingerprint of the secret with the new fingerprint.

The method allows the reference fingerprint associated with the secret constructed from the password and from the first piece of context information to be updated.

In one example embodiment, the method comprises transmitting, to the user, a question associated with the first piece of context information.

The display of a question associated with the first piece of context information means that a minimum of effort is required on behalf of the user, who is thus prompted to deliver the information in response. Moreover, this allows the verifier to guarantee the variability in the first piece of information.

In a first example embodiment, the method comprises:
converting the first piece of context information into a numerical value,
using the numerical value as a salt of the one-way function for computing the current fingerprint.

In this example, the first piece of context information is converted into a numerical value, then used as additional salt in the one-way function used to calculate the current fingerprint of the secret. This creates a corresponding additional complexity for an attacker making an exhaustive search for the password and for the first piece of context information that form the secret.

In a second example embodiment, the method comprises:
converting the first piece of context information into a numerical value,
computing the current fingerprint of the password resulting from iteration of the one-way function a number of times equal to the numerical value.

In this example, the first piece of context information is converted into a numerical value, then used as the value of the number of iterations of the one-way function used to calculate the current fingerprint. Thus, the number of iterations of the one-way function is variable. This creates an additional complexity for an attacker making an exhaustive search for the password and for the first piece of context information that form the secret.

The invention also relates to a verifier arranged to authenticate a user, said server comprising:
receiving means, arranged to receive a password and a first piece of context information that are input by the user,
computing means, arranged to compute a current fingerprint, by applying a one-way function to the password and to the first piece of context information,
verifying means, arranged to verify that the computed current fingerprint is equal to a reference fingerprint of a secret, which fingerprint was calculated during a preceding authentication of the user, the authentication being successful when the current fingerprint is equal to the reference fingerprint.

In one example embodiment, the verifier comprises:
second receiving means, arranged to receive a second piece of context information,
computing and replacing means, arranged to compute a new fingerprint, by applying the one-way function to the password and to the second piece of context information, and to replace the reference fingerprint of the secret with the new fingerprint.

The invention also relates to a computer program on a data storage medium and able to be loaded into the memory of a computer, the program comprising code sections for executing the steps of the authentication method such as described above when the program is executed on said computer.

The invention also relates to a data storage medium on which the above program is stored.

BRIEF DESCRIPTION OF THE DRAWINGS

Other features and advantages of the present invention will be better understood from the description and the appended drawings, in which.

DETAILED DESCRIPTION OF ILLUSTRATIVE EMBODIMENTS

Figure 1:
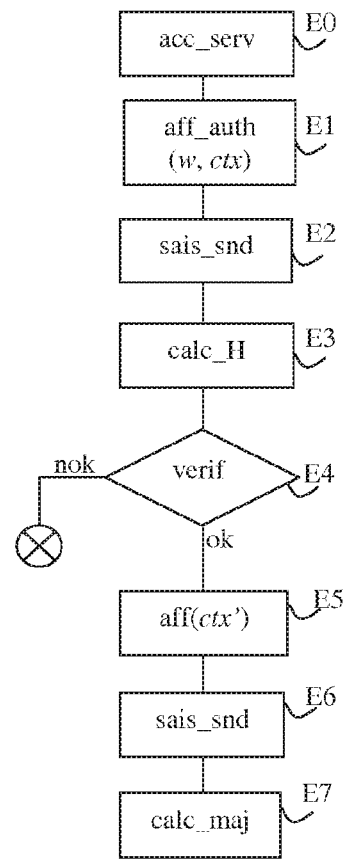
FIG. 1 shows the steps of an authentication method, according to one example embodiment.

The steps of an authentication method, according to one example embodiment, will now be described with reference to FIG. 1.

A user, equipped with a terminal (not shown in FIG. 1), wants to gain remote access to a sensitive service to which he has subscribed. Access to the service requires successful authentication of the user by an authentication server, or verifier (not shown in FIG. 1).

The verifier comprises a software module that comprises code instructions that are able to implement the authentication method described here.

In an initial step E0 of access to the service, the user accesses the service, for example by inputting a URL (uniform resource locator) allowing access to the service into a browser of his terminal. This access triggers, in a step E1, the transmission by the verifier and the display on the terminal of the user of an authentication page intended to ask the user to input authentication information.

The displayed page comprises a zone for inputting a password w, and a zone for inputting a first piece of context information ctx. The password w will have been chosen beforehand by the user, for example when the service is first accessed after subscription to the service. The password w has a certain lifetime, which is managed by the verifier. The first piece of context information ctx is intended to introduce a variable segment into the password. More precisely, the password w and the first piece of context information ctx are associated to form a secret, used to access the service and one portion of which is variable. The first piece of context information ctx may be qualified a secondary secret with respect to the password w, which is the main secret of the user. It will have been input during a preceding authentication and more precisely during the last authentication of the user.

In one example embodiment, a display zone is associated with the first piece of context information ctx. This zone is intended to display a question associated with the first piece of context information, so as to help the user input the first piece of context information ctx. Specifically, the first piece of context information ctx may change frequently. Associating a question therewith makes it possible to help the user recall it more easily. In one example embodiment, no display zone is associated with the first piece of context information. Thus, the user must input this first piece of context information without receiving any indication from the verifier as to the nature of this piece of information. This allows the amount of information that an attacker is able to obtain with a view to identifying the first piece of context information to be decreased.

In a first example embodiment, the first piece of context information ctx has a substantial variability insofar as it is liable to vary on each authentication. For example, the question that features in the display zone associated with the first piece context of information relates to the day's weather, or to a time or a date, to a place in which the user is found, etc. In a second example embodiment, the first piece of context information ctx has a lesser variability, insofar as it does not vary for a given period of time and remains identical during successive authentications implemented during this time period. For example, the question that features in the display zone asks the user his age, his weight, his address, etc. It will be understood that, in this case, less effort is required by the user to memorize the first piece of context information.

A substantial variability in the first piece of context information ctx allows the secret to be made to vary very often without however requiring the password w to be changed.

In a following inputting and transmitting step E2, the user provides his password w and the first piece of context information ctx. Once input, the password w and the first piece of context information ctx are transmitted to the verifier.

In a step E3 of computing a current fingerprint, the verifier computes a current fingerprint of the secret, which depends on the pas sword w and on the first piece of context information ctx. To this end, a non-invertible function H is applied to the password w and to the first piece of context information ctx. A non-invertible function is such that, starting with an image of an element x by the function, denoted H(x), it is difficult to determine x. The non-invertible function H is for example a secure hash function such as the SHA-3 secure hash algorithm. In a first example computation, the current fingerprint of the secret is equal to H^k (w –||s |n), where n is a numerical value obtained by converting the first piece of context information ctx into a numerical value by means of a conversion function G, where s is a value generated pseudo-randomly by the verifier 11 and commonly called a "salt", and where k is a constant value chosen by the verifier and intended to set a number of invocations of the one-way function H. The role of a salt is to make, for the attacker, an exhaustive search of a set of passwords more complex. Specifically, use of a salt may create a need for more computational power and/or more memory. In one example embodiment, the conversion function G is a non-invertible function, for example a hash function. The advantage of such a function is that it slows, for the attacker, the exhaustive search for the password because the attacker must also identify the first piece of context information ctx from the numerical value n, since n=G(ctx). In this example, the numerical value n plays the role of an additional salt with respect to s and further complexifies the search for a password. The use of the constant k is intended to slow the discovery of a password via an exhaustive-search attack by artificially making the computations more difficult by invoking the non-invertible function a plurality of times. Specifically, the cost of such an attack is multiplied by k for the attacker.

In a second example computation, the current fingerprint of the secret is equal to H to a set of possible passwords w' for an identified salt s', and then searches in the obtained set of values for the current fingerprint of a secret in order to identify the password w, not knowing n. In this example, the hash function H is invoked n-times. This example is advantageous insofar as the value of n may vary from one authentication to the next. It is therefore impossible to know the number of iterations of the non-invertible function H in advance. Thus, in the case where the attacker applies the one-way function H to a set of possible passwords w' for an identified salt s', and then searches in the obtained set of values for the current fingerprint of a secret in order to identify the password w, not knowing n means that additional computational power and an additional memory space are required, and it is furthermore not guaranteed that the password will be identified in the end. Specifically, the attacker must iterate the application of the one-way function H an unknown number of times, since he does not known. He must then compare the current fingerprint to the obtained values. Moreover, it will be noted that if n is lower than the number of iterations, chosen by the attacker, of the function H, the attacker has a chance of identifying the password. If in contrast, the number of iterations is higher than n, the attacker has little chance of finding the password.

In a verifying step E4, the server 11 verifies that the current fingerprint of the secret is present in a database of reference fingerprints. The database of reference fingerprints comprises, for all of the users that have subscribed to the service, a reference fingerprint of their secret. The reference fingerprint is assumed to be valid, i.e. to have been computed with the password w of the user and with a piece of context information provided during the last successful authentication of the user.

In a first case (branch "nok" in FIG. 1) in which the current figure print does not feature in the database of reference fingerprints, the method stops. Specifically, the authentication of the user has failed. Procedures for re-requesting the password and the first piece of context information, or even for blocking access to the service when erroneous information has been input a maximum number of times, may be implemented. These procedures are conventional and are not described here.

In a second case (branch "ok" in FIG. 1), the current fingerprint features in the database of reference fingerprints. This means that the authentication of the user has succeeded. Specifically, the password w and the first piece of context information ctx are assumed to be correct since the current fingerprint calculated with these two values has been found in the database of reference fingerprints. The user may then access the service.

In a following step E5 of requesting a second piece of context information, the authentication server 11 asks the user to input a second piece of context information ctx'. A second input zone is displayed for this purpose. The second piece of context information [ctx] ˆ' is intended to be used to construct a new reference fingerprint of the secret by applying the one-way function H to the password w and second piece of context information [ctx] ˆ', and to replace the reference fingerprint in the database of reference fingerprints for a subsequent authentication. It is important for the choice of the question, on which the nature of the second piece of information depends, to be made by the verifier. This makes it possible to guarantee the variability in this second piece of context information and therefore in the secret constructed and stored by way of new reference fingerprint.

In an inputting and transmitting step E6, the user inputs the requested information. The input second piece of context information ctx' is transmitted to the verifier.

In a computing and updating step E7, the verifier computes the new reference fingerprint and records it in the database of reference fingerprints, in association with the user. This new reference fingerprint replaces the reference fingerprint associated with the user in the database of reference fingerprints.

In other words, during a current authentication, a first and a second piece of context information are requested from the user. The first piece of context information is the piece of information that was input during the last authentication of the user; it is used for the current authentication of the user. The second piece of context information, which is requested during the current authentication, is intended to be requested during the next authentication of the user.

In the example embodiment described here, the second piece of context information ctx' is requested only after the password w and the first piece of context information ctx have been verified. In another example, the password w and the first and second pieces of context information ctx, ctx' are requested at the same time. The verification of the secret is then implemented.

Thus, the user must always memorize a main secret: the password w. The password is enduring and often complex: it in general comprises a minimum number of characters, and is formed from various types of characters such as numbers, letters and punctuation marks. The user must also memorize a piece of context information that is hardly complex at all and that requires little effort to remember. This context element introduces a substantial variability into the secret and impacts the reference fingerprint stored in the database of reference fingerprints.

An attacker who desires to steal the identity of a user in order to access a service using his authentication data must therefore obtain the reference fingerprint associated with the user each time said fingerprint is changed, i.e. potentially on each authentication. He must then employ a certain amount of computational power to obtain the password and the piece of context information used to compute the secret that allows the user to be successfully authenticated. However, these pieces of information are changed on each successful authentication of the user.

Let us for example consider a reference fingerprint of the form $H^k(w|s|n)$. An attack on such a fingerprint, if it succeeds, allows the attacker to obtain the password w, and the numerical value n that corresponds to a piece of context information. If t_1 is the number of possible values for w, t_2 the number of possible values for n, then the attacker must invoke the hash function H $(t)$ _1×t_2×k)-times, this increasing the cost of an attack by a factor t_2 with respect to conventional techniques. Furthermore, knowledge of n alone does not allow the attacker to acheive authentication since n was obtained by applying a conversion function G to a piece of context information. The attacker must therefore also invert the conversion function G, this representing an additional cost. If the attacker succeeds in obtaining the password w and the piece of context information ctx, he may then imitate the user and complete a successful authentication provided that the latter does not complete a successful authentication and cause the piece of context information ctx, and therefore n, to change. In this case, the attacker must determine a new reference fingerprint $H^k$ (w|s|n'), then perform new computations to find n'' then the associated piece of context information. When the numerical value n is used as an additional salt, i.e. in the case where the reference fingerprint is of the form: $H^k(w|s|n)$, the number of possible values for n must be higher than a minimum value in order to slow down an exhaustive search.

When the numerical value n is used as a number of iterations of the one-way function H, i.e. in the case where the reference fingerprint is of the form: $H^n(w|s)$, n must be higher than a minimum value, so as to slow down an exhaustive search, and lower than a maximum value, in order for the computation of a current fingerprint during an authentication to remain negligible.

One advantageous application of the method is in access to sensitive services, for example services such as online-banking services, email-account services, online-purchase services, etc. In this case however, the user must memorize as many pieces of context information as there are sensitive services implementing the method. In order to facilitate the management of these pieces of context information, the user may use a conventional means for storing passwords such as a password manager.

Figure 2:
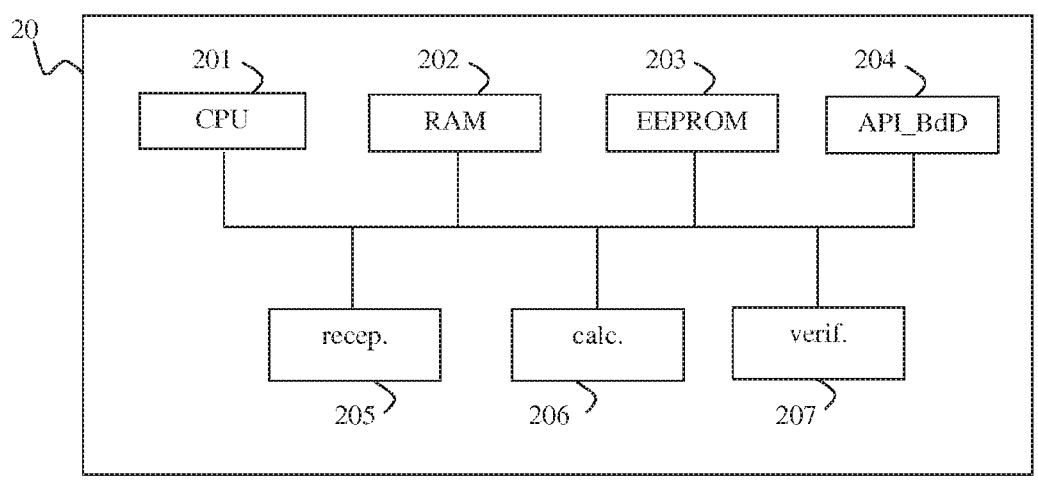
FIG. 2 is a schematic representation of a verifier, able to implement the authentication method, according to one example embodiment.

A verifier arranged to implement an authentication such as described above will now be described with reference to FIG. 2.

A verifier 20 is a piece of computational equipment, such as a server. It conventionally comprises:
- a processing unit or processor 201 or CPU (central processing unit), intended to load instructions into memory, to execute them and to perform operations;
- a set of memories, including a volatile memory 202, or "RAM" for ("random access memory"), used to execute code instructions, store variables, etc., and an "EEPROM" storage memory 203 ("electrically erasable programmable read-only memory"). In particular, the storage memory 203 is arranged to store an authentication software module that comprises code instructions for implementing the steps of the authentication method such as described above;
- an interface for accessing a fingerprint database 204, which is arranged to access a database of reference fingerprints. The database of reference fingerprints contains, for each of the users subscribed to the service, a reference fingerprint of the secret, said reference fingerprint being associated with an identifier of the user. The reference fingerprint of the secret is computed by the authentication server depending on the password w and on the piece of context information that was input by the user during the last successful authentication, which will have occurred during a previous access by the user to the service.

The verifier also comprises:
- a receiving module 205, arranged to receive a password and a first piece of context information, said password and piece of context information being entered by the user. The receiving module 205 is arranged to implement step E2 of the authentication method such as described above;
- a computing module 206, arranged to compute a current fingerprint, by applying a one-way function to the password and to the first piece of context information. The computing module 206 is arranged to implement step E3 of the authentication method described above;
- a verifying module 207, arranged to verify that the computed current fingerprint is equal to a reference fingerprint of a secret, which fingerprint was calculated during a preceding authentication of the user, the authentication being successful when the current fingerprint is equal to the reference fingerprint. The verifying module 207 is arranged to implement step E4 of the authentication method described above.

The receiving module 205, computing module 206, verifying module 207 and the interface for accessing the fingerprint database 204 are preferably software modules comprising software instructions for implementing the steps of the authentication method described above.

The invention therefore also relates to:
- a computer program including instructions for implementing the authentication method such as described above when this program is executed by a processor of the verifier 20,
- a readable storage medium on which the above-described computer program is stored.

In one example embodiment, the verifier also comprises the following modules (not shown in FIG. 2):
- second receiving means, arranged to receive a second piece of context information ctx'. The second piece of context information is intended to be used to update the fingerprint of the secret in the database of the reference fingerprints;
- computing and replacing means, arranged to compute a new fingerprint of the secret, by applying a one-way function H to the password w and to the second piece of context information ctx'. The computing and replacing means are also arranged to replace the reference fingerprint of the secret in the database of the reference fingerprints with the new fingerprint.

Although the present disclosure has been described with reference to one or more examples, workers skilled in the art will recognize that changes may be made in form and detail without departing from the scope of the disclosure and/or the appended claims.

The invention claimed is:

1. A method for authentication of a user by a verifier, said method being implemented by a verifier device and comprising:
    receiving a password input by the user and a first piece of context information input by the user, said piece of context information being changed on each authentication,
    computing a current fingerprint, by applying a one-way function to the password and to the first piece of context information,
    verifying that the computed current fingerprint is equal to a reference fingerprint of a secret, which was calculated during a preceding authentication of the user, the authentication being successful when the current fingerprint is equal to the reference fingerprint,
    receiving a second piece of context information, and
    computing a new fingerprint, by applying the one-way function to the password and to the second piece of context information, and replacing the reference fingerprint of the secret with the new fingerprint.

2. The method as claimed in claim 1, comprising transmitting, to the user, a question associated with the first piece of context information.

3. The method as claimed in claim 1, comprising:
    converting the first piece of context information into a numerical value,
    using the numerical value as a salt of the one-way function for computing the current fingerprint.

4. The method as claimed in claim 1, comprising:
    converting the first piece of context information into a numerical value,
    computing the current fingerprint of the password resulting from iteration of the one-way function a number of times equal to the numerical value.

5. A verifier device arranged to authenticate a user, said verifier device comprising:
    a processor; and
    a non-transitory computer-readable medium comprising instructions stored thereon, which when executed by the processor configure the verifier device to perform acts comprising:
    receiving a password and a first piece of context information that are input by the user, said piece of context information being changed on each authentication,
    computing a current fingerprint, by applying a one-way function to the password and to the first piece of context information,
    verifying that the computed current fingerprint is equal to a reference fingerprint of a secret, which was calculated during a preceding authentication of the user, the authentication being successful when the current fingerprint is equal to the reference fingerprint,
    receiving a second piece of context information, and
    computing a new fingerprint, by applying the one-way function to the password and to the second piece of context information, and replacing the reference fingerprint of the secret with the new fingerprint.

6. A user terminal, arranged to allow a user of the terminal to be authenticated by a verifier device, the user terminal comprising:
    a processor; and
    a non-transitory computer-readable medium comprising instructions stored thereon, which when executed by the processor configure the user terminal to perform acts comprising:
    receiving a password and a first piece of context information input to the terminal by the user, said piece of context information being changed on each authentication by the verifier device;
    transmitting the password and the first piece of context information to the verifier device to compute a current fingerprint by applying a one-way function to the password and to the first piece of context information, and to authenticate the user by using the current fingerprint;
    receiving a second piece of context information input to the terminal by the user when the authentication of the user by the verifier device has succeeded; and
    transmitting said second piece of context information to the verifier device to be used to construct a new reference fingerprint, by applying the one-way function to the password and to the second piece of context information, said new reference fingerprint replacing the current fingerprint.

* * * * *